US012599952B2

(12) United States Patent
Susnjara

(10) Patent No.: US 12,599,952 B2
(45) Date of Patent: *Apr. 14, 2026

(54) METHODS AND SYSTEMS FOR SECURE CONNECTIONS IN LAYER SEGMENTS OF CUT LAYER ADDITIVE PARTS

(71) Applicant: Thermwood Corporation, Dale, IN (US)

(72) Inventor: Kenneth J. Susnjara, Birdseye, IN (US)

(73) Assignee: Thermwood Corporation, Dale, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/977,292

(22) Filed: Dec. 11, 2024

(65) Prior Publication Data

US 2025/0196216 A1     Jun. 19, 2025

Related U.S. Application Data

(63) Continuation of application No. 18/545,510, filed on Dec. 19, 2023, now Pat. No. 12,194,526.

(51) Int. Cl.
B21D 28/26          (2006.01)
B23P 19/10          (2006.01)
(52) U.S. Cl.
CPC .............. B21D 28/26 (2013.01); B23P 19/10 (2013.01)
(58) Field of Classification Search
CPC ................................ B21D 28/26; B23P 19/10
See application file for complete search history.

(56) References Cited

U.S. PATENT DOCUMENTS

| | | | |
|---|---|---|---|
| 5,305,812 A * | 4/1994 | Ferencsik ................. | B27C 5/02 269/41 |
| 5,505,365 A * | 4/1996 | Olsen ................... | B23K 33/008 228/171 |
| 7,032,426 B2 * | 4/2006 | Durney ..................... | E04C 2/08 72/379.2 |
| 8,147,162 B1 | 4/2012 | Burnett et al. | |
| 11,345,081 B1 | 5/2022 | Susnjara | |
| 12,194,526 B1 * | 1/2025 | Susnjara ................ | B33Y 10/00 |

(Continued)

FOREIGN PATENT DOCUMENTS

| | | |
|---|---|---|
| EP | 3659748 B1 | 6/2020 |
| JP | H04-504985 A | 9/1992 |

(Continued)

OTHER PUBLICATIONS

Extended European Search Report issued in corresponding European Application No. 24218432.3, mailed May 21, 2025.

*Primary Examiner* — Sarang Afzali
(74) *Attorney, Agent, or Firm* — Bookoff McAndrews, PLLC

(57)          ABSTRACT

A system for manufacturing a part with a plurality of segments, the system including a machining apparatus configured to receive material, and a controller configurable to generate commands to control the machining apparatus. The controller being configurable to cause the machining apparatus to form a plurality of segments from material, cause the machining apparatus to form complementary shapes in ends of two or more segments of the plurality of segments, and cause the machining apparatus to form openings in the ends of the two or more segments.

14 Claims, 6 Drawing Sheets

(56)                          References Cited

U.S. PATENT DOCUMENTS

| 2007/0220729 | A1 | 9/2007 | Vaes |
| 2009/0229105 | A1 | 9/2009 | Schubetzer et al. |

FOREIGN PATENT DOCUMENTS

| JP | H10-184622 | A | 7/1998 |
| JP | 2005-188267 | A | 7/2005 |
| JP | 5235935 | B2 | 7/2023 |
| WO | 2023/099208 | A1 | 6/2023 |
| WO | 2025071893 | A1 | 4/2025 |

* cited by examiner

METHODS AND SYSTEMS FOR SECURE CONNECTIONS IN LAYER SEGMENTS OF CUT LAYER ADDITIVE PARTS

CROSS-REFERENCE TO RELATED APPLICATIONS

This patent application is a continuation of and claims the benefit of priority to U.S. application Ser. No. 18/545,510, filed on Dec. 19, 2023, now U.S. Pat. No. 12,194,526, the entirety of which is incorporated herein by reference.

TECHNICAL FIELD

Aspects of the present disclosure relate to systems and methods for fabricating components. In some instances, aspects of the present disclosure relate to systems and methods for fabricating components (such as, e.g., patterns, molds, and similar products, and others) via techniques or processes that have similarities with 3D printing processes involving layering. These techniques or processes may enable, in at least some embodiments, production of lower-cost molds or tooling without the use of a 3D printer.

BACKGROUND

Additive manufacturing techniques and processes generally involve the buildup of one or more materials to make a net or near net shape (NNS) object, in contrast to subtractive manufacturing methods. Although "additive manufacturing" is an industry standard term (ASTM F2792), additive manufacturing encompasses manufacturing and prototyping techniques known under a variety of names, including freeform fabrication, 3D printing, rapid prototyping/tooling, etc.

Some additive manufacturing techniques use large-scale 3D printers that are capable of fabricating very large parts, molds, patterns, etc. These parts can be produced from fiber-reinforced thermoplastic materials, for example. One method of producing these parts utilizes a polymer extruder which generates a bead of molten thermoplastic material, beads of this material being added in sequence so that the part is produced one layer at a time. These layers can be modified and/or flattened into wider beads during this additive process using devices such as tamping plates, rollers, or the like. Using these approaches, sometimes referred to as 3D printing, the part is made slightly larger than desired. After the part cools and hardens, it is then machined to the final size and shape. The resulting part is generally a shell of a specific thickness and of the approximate size and shape desired.

Another type of additive manufacturing can be referred to as "cut layer" additive manufacturing. In some examples of cut layer additive manufacturing, pieces can be cut from porous material, stacked on top of one another, and attached together to create a part. In some cases, this part may be hollow, comprised of individual parts that are formed as narrow beads that, when stacked together, create a shell or wall around the outside shape of the desired part. In some approaches, a shell or wall is built from a porous material and infused with a catalyzed thermoset liquid. The liquid cures to produce a rigid composite part reinforced with the porous material.

There are times, however, when it is desirable to produce a part from non-porous material such as a metal (e.g., aluminum). Examples of potential applications for such a part include industrial molds and tooling for use in plastic molding processes such as thermoforming, blow molding, rotational molding, and reaction injection molding. In general, aluminum molds for applications such as compression or injection molds are not suitable for long-term production but can be desirable for prototyping and short run sample production, provided that the aluminum molds have a suitable cost and can be produced in an appropriate period of time.

One reason aluminum or other materials that, while having desirable properties, are not used for at least some applications, such as molds and tooling, is that these relatively large parts involve use of large blocks of material and significant time to remove (e.g., machine away) excess material to produce the desired cavity shape of the mold. This is especially true of large, deep parts where half the material, or more, may need to be removed to achieve the desired geometry for the final part.

Some parts, including tooling, might also benefit from structures having internal channels through which heated or cooled liquid can be circulated to control the temperature of the tool during operation. However, machining these channels in a solid block of material requires significant time and specialized equipment, further increasing build time and cost. Also, in some cases, it might not be possible to locate these channels in certain areas of the mold by machining into a solid block from the outside. This might make it impractical, or even impossible, to create channels in some locations of parts made via traditional additive manufacturing techniques.

In cut layer additive manufacturing, sheets of material can be used, these sheets generally having a lower cost per a pound of final product as compared to parts formed from one or more large blocks of the same material. Cut layer manufacturing may be beneficial by involving machining of less material to produce a final product. Also, cut layer manufacturing can provide the ability to form heating and/or cooling channels into cut sheets that could not be easily machined in a solid block of material.

For certain applications, such as molds for plastic processing, it may be desirable that the surface of the cut layer structure, after assembly, appears as if it were a solid piece of material (e.g., metal), rather than a structure assembled from a series of separate portions. To facilitate assembly of parts for these applications, individual layer segments, as well as layers formed by these segments, should be tightly connected.

SUMMARY

Aspects of the present disclosure relate to, among other things, methods and apparatus for fabricating components via layering techniques. Each of the aspects disclosed herein may include one or more of the features described in connection with any of the other disclosed aspects. Objects of this disclosure include, for example, a method for achieving a tight connection between individual layer segments that are connected end to end to each other.

A method performed according to the present disclosure may begin, for example, by cutting the ends of layer segments that will be mated together. These ends may be cut into a V-shape, or another shape, that prevents the two mating ends from sliding relative to each other (e.g., side to side) when pulled tightly together. Following the formation of the shaped ends, a hole may be drilled or milled into each of the mating ends of the layer segments. Next, a slot may be milled from the hole to the end of each of the layer segments, such that pairs of slots match each other and align when the ends of the two layer segments are fitted together end to end. This may form an anti-slip connection.

To facilitate this connection, a connecting device with a shape that matches the shapes of the two through-holes or blind holes (which may have a dumbbell shape, as an example) may be used. The connecting device may include a portion shaped to match the slots connecting the two holes. The connecting device may be tapered from a larger top profile to a smaller bottom profile, where the bottom easily fits (e.g., with a clearance) into the dumbbell-shaped hole in the end of the two layer segments, while the top of the connecting device forms an interference fit. Therefore, as the connecting device is pressed into the holes, it may force the two layer segments to come together tightly, holding the two ends together with significant pressure.

In one aspect, a method of manufacturing a part with a plurality of cut segments may include receiving a sheet of material with a machining apparatus, removing material with the machining apparatus to form a plurality of segments in the sheet of material, and forming complementary shapes in ends of two or more segments of the plurality of segments. The method may further include forming slots in the two or more segments, aligning the slots in the two or more segments to form a cavity, and inserting a connecting device to fill the cavity.

In another aspect, a method of manufacturing a part with a plurality of cut segments may include receiving a sheet of material with a machining apparatus, removing material with the machining apparatus to form a plurality of segments in the sheet of material, and forming a recessed end extending from a face of a first one of the two more segments. The method may further include forming a protruding end having a shape that is complementary to a shape of the recessed end, inserting the protruding end into the recessed end, and securing the protruding end to the recessed end.

In yet another aspect, a system for manufacturing a part with a plurality of segments may include a machining apparatus configured to receive a sheet of material and a controller configured to generate commands to control the machining apparatus. The controller may be programmed to cause the machining apparatus to remove material to form a plurality of segments from the sheet of material, cause the machining apparatus to form complementary shapes in ends of two or more segments of the plurality of segments, and cause the machining apparatus to form slots in the two or more segments.

BRIEF DESCRIPTION OF THE DRAWINGS

The accompanying drawings, which are incorporated in and constitute a part of this specification, illustrate exemplary aspects of the present disclosure and together with the description, serve to explain the principles of the disclosure.

DETAILED DESCRIPTION

The present disclosure is drawn to, among other things, methods and systems for fabricating different types of components via layering techniques. Specifically, the methods and systems described herein may achieve a tight connection between individual layer segments that are connected end-to-end to fabricate a layer.

In contrast to some manufacturing methods, including methods in which a solid block of material is machined, aspects of the present disclosure include assembling a part, such as a mold blank, by stacking layer segments that are cut and separated from sheets of the material. The material may be a solid, nonporous, material such as aluminum. In some aspects, a layered mold blank is produced, this blank being approximately the desired size and shape of the final mold. This layered mold blank may then be machined to the final size and shape. These steps may produce a part that is built in layers and that is similar in structure to parts more traditional additive manufactured parts.

Figure 1:
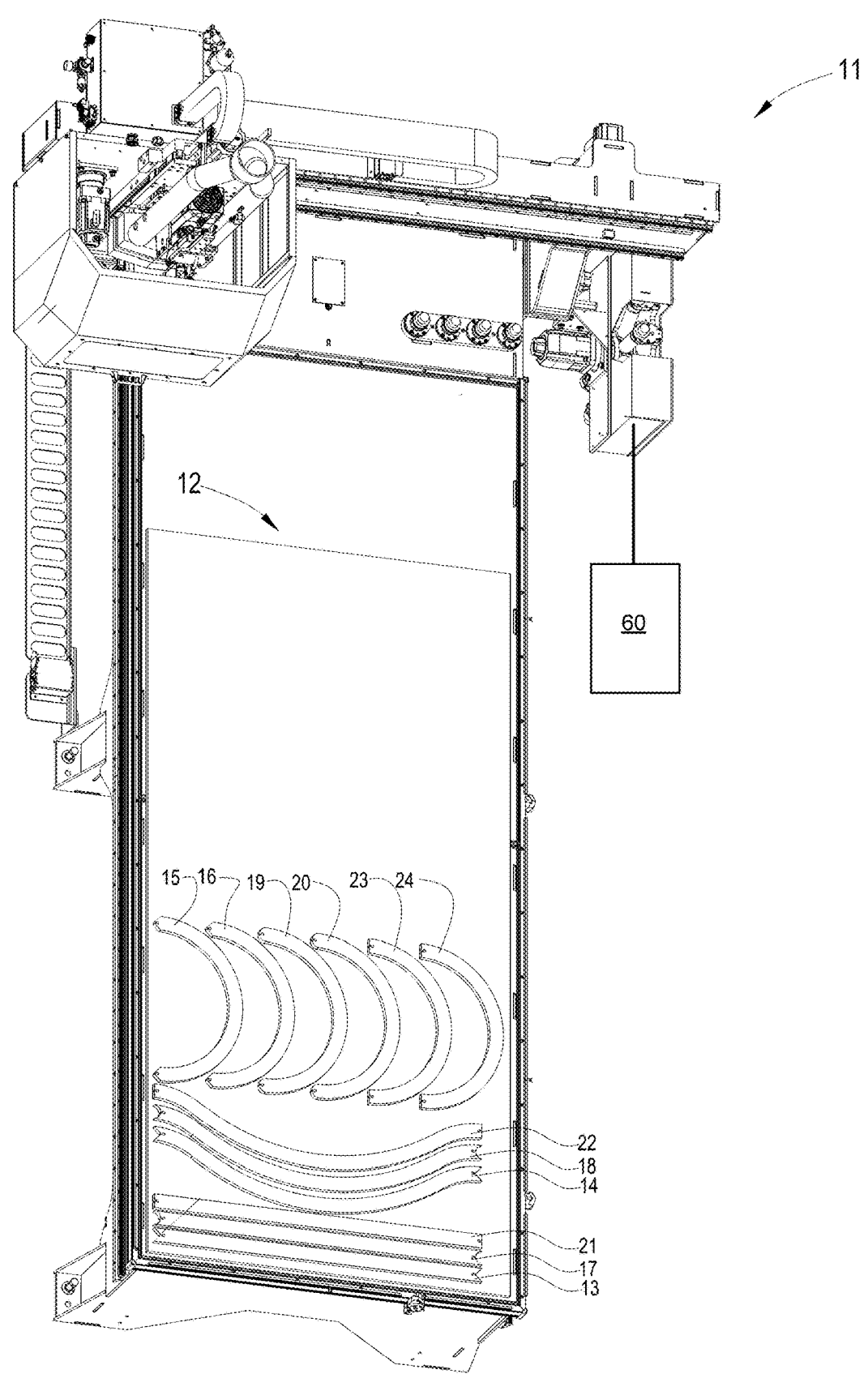
FIG. 1 is a perspective view of an exemplary material removal device (e.g., a CNC machine) operable to rout out layers of sheet material, according to an aspect of the present disclosure.

As shown in FIG. 1, layers may be cut from sheets of material 12, using a cutting machine 11, such as a CNC router. A controller 60 may be incorporated in machine 11 and/or may be part of a system for manufacturing a part, as described herein. Controller 60 may be configured to generate comments to cause machine 11 to remove material from a sheet 12 to form a plurality of layers, as also described herein. Machine 11 may be configured to receive one or more sheets 12 of material, one or multiple sheets 12 providing the material for forming segments that, when assembled, form a complete part.

These layers may be assembled together to form a part, as opposed to processes in which layers are applied to each other during a printing process. The individual layers may be fastened together in various methods, including covering assembled layers with plastic (e.g., a resin).

One or more of the layers for the part may include a plurality of individual layer segments. For example, a first layer may be formed by segments 13, 14, 15, and 16, a second layer may be formed by segments 17, 18, 19, and 20, and a third layer may be formed by segments 21, 22, 23, and 24.

Figure 2A:
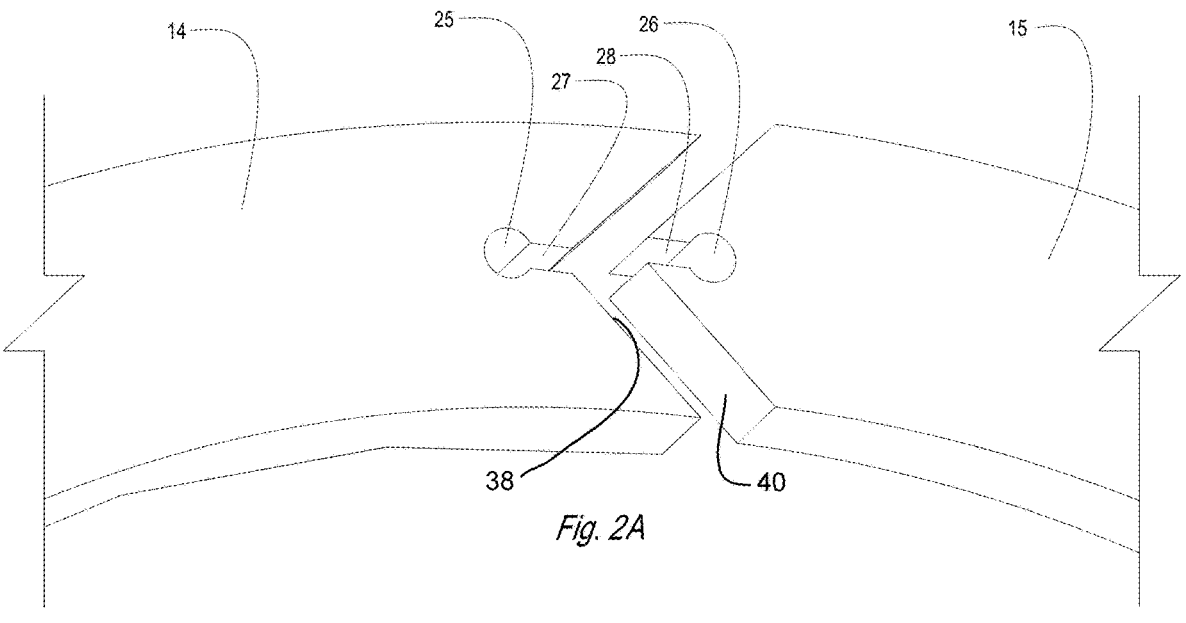
FIGS. 2A and 2B are enlarged perspective views of an exemplary layer segments with "V"-shaped tapered ends that interlock with one another, each tapered end having a cavity formed by a hole and slot, according to aspects of the present disclosure.

In some aspects, fastening segments of a particular layer together in a manner that allows plastic to be formed over the layers can be challenging. With reference to FIG. 2A, an exemplary approach to address these challenges includes machining corresponding shapes, such as matching tapers, in ends of opposing segments.

In the example shown in FIG. 2A, a layer segment 14 may be machined with cutting machine 11 to form complementary shapes which include complementary surfaces, such as surfaces 38 and 40. These complementary shapes may include a "V" taper shape having a recessed center extending within a face (e.g., lateral end) of layer segment 14 and protruding lateral ends of the face of segment 14.

Figure 2B:
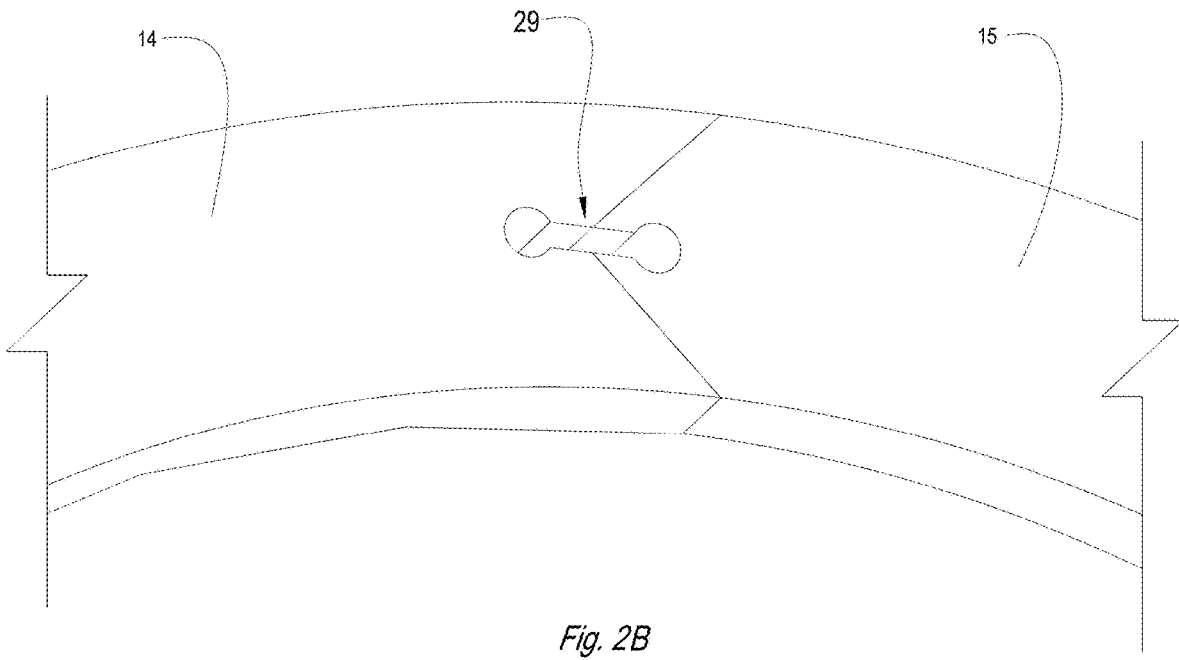

A mating or otherwise complementary "V" taper shape may be formed via a machining process performed with machine 11 on layer segment 15, resulting in a protruding center and recessed lateral ends. The ends of segments 14 and 15 may be shaped such that when they are connected together, the ends of segments 14 and 15 lock together as shown in FIG. 2B. Once abutting in the manner shown in FIG. 2B, segments 14 and 15 are restricted from moving relative to one another side to side. While FIGS. 2A and 2B illustrate an exemplary taper forming an angle (e.g., an angle of about 90 degrees as measured from two surfaces that form legs of the "V"), other complementary shapes are possible. As also understood, when a "V" taper shape is used, the "V" taper shown in FIG. 2A is one example. Other examples of "V" tapers can instead have a slight "V" taper formed by a larger angle (e.g., an obtuse angle formed by the legs of the "V") or a deeper "V" taper formed by a narrower angle (e.g., an acute angle formed by legs of the "V").

In at least some aspects, a first hole 25 and a second hole 26 may be drilled or machined into the ends of layer segment 14 and layer segment 15. This may be performed by removing material from above, with machine 11 for example, at a location that is a small distance from the point where the layer segments connect.

In addition to holes 25 and 26, which may be through-holes or blind holes, one or more slots may be formed in segments 14 and 15. For example, a first slot 27 may be formed at the end of segment 14, while a second slot 28 is formed at the end of segment 15. Slots 27 and 28 may have widths that are smaller than the diameter of holes 25 and 26. In some aspects, the widths of slots 27 and 28 may be the same or about the same.

Slots 27 and 28 may be machined so as to extend from ends of holes 25 and 26 and through the end of the respective segment 14 or 15. Thus, when the two layer segments 14 and 15 are placed end-to-end and mated for assembly as shown in FIG. 2B, slots 27 and 28 form portions that, when aligned with each other, form a single continuous slot of a cavity 29. Cavity 29 may include this continuous slot and the machined holes 25 and 26 in the ends of layer segments 14 and 15. In the example shown in FIG. 2B, cavity 29 has a dumbbell shape formed by holes 25 and 26 having a larger width than the continuous slot formed by slots 27 and 28.

Figure 3:
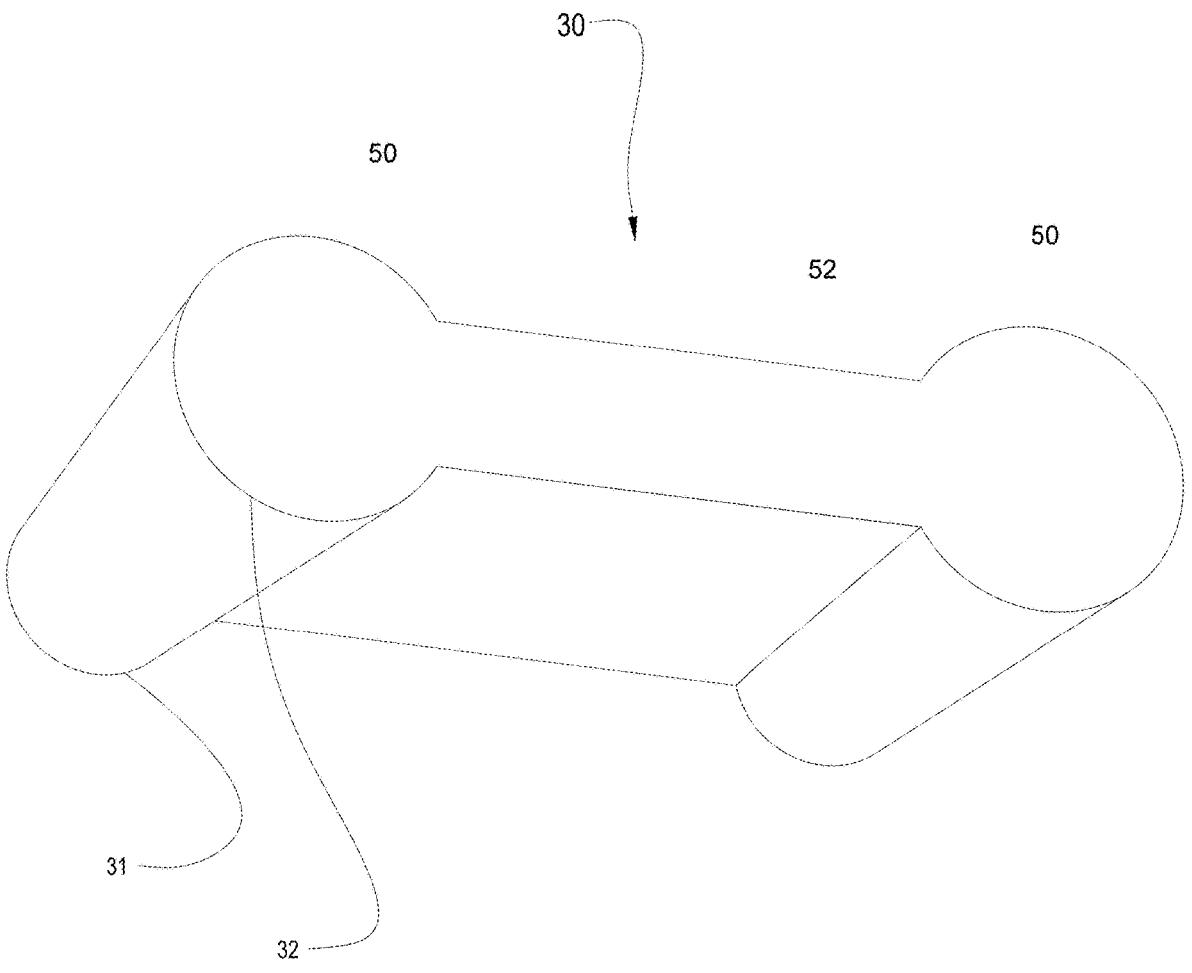
FIG. 3 is a perspective view of exemplary connecting device with a bottom that is smaller than the cavity for receiving the connecting device, and the top having a size that is the same or slightly larger than the size of the cavity.

As shown in FIG. 3, a connecting device 30 may be formed for use with segments 14 and 15. In some configurations, connecting device 30 may be constructed from the same material as that of layer segments 14 and 15, such as aluminum or another metal. However, connecting device 30 may be formed from one or more different materials, if desired.

With reference to FIG. 3, connecting device 30 may have the same general shape as holes 25 and 26 and slots 27 and 28 formed between the layer segments 14 and 15 when these segments are mated for assembly. As shown in the illustrated example, connecting device 30 may have a barbell shape when viewed from above, with two generally-circular sides 50 connected by a linearly-extending bridge 52.

In at least some embodiments, connecting device 30 may have a shape that tapers. This tapering may be formed between front and rear ends of device 30. As shown in FIG. 3, device 30 may taper so as to have a smaller rear end 31 and an enlarged front end 32, defining at least one wall that tapers from enlarged end 32 to smaller end 31. Each end 31 and 32 may include the circular sides 50 and the bridge 52 connecting these sides. Sides 50 and bridge 52 of the smaller rear end 31 may define a periphery that is smaller than a corresponding periphery defined by sides 50 and bridge 52 of front end 32.

In some embodiments, the outer perimeter of connecting device 30 may, at bottom end 31, be slightly smaller than machined cavity 29 (FIGS. 2A and 2B) between the mated layer segments. Enlarged end 32 of connecting device 30 may have an outer perimeter that is about the same size, or slightly lager, than machined cavity 29. This smaller outer perimeter of connecting device 30 may facilitate insertion of connecting device 30 into cavity 29. Sides 50 of device 30 may, at enlarged end 32, be larger (e.g., in diameter) than one or both of holes 25 and 26. Additionally or alternatively, bridge 52 of enlarged end 32 may be larger (e.g., in width) than one or both of slots 27 and 28.

Figure 4:
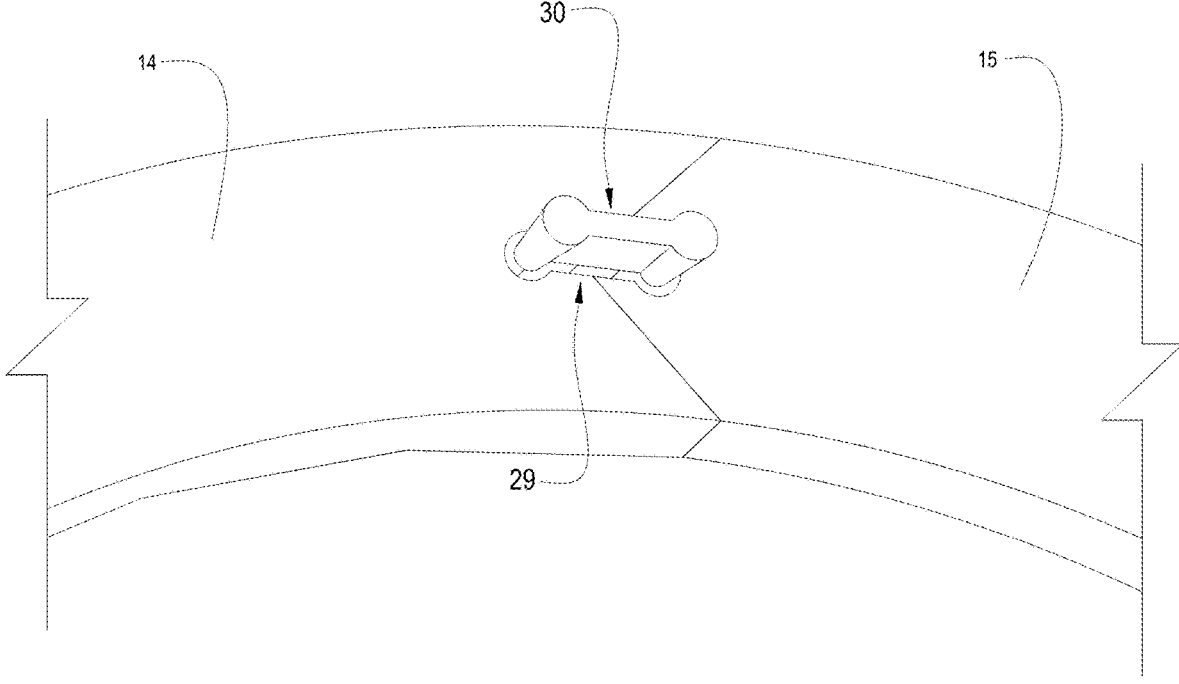
FIG. 4 is a perspective view of exemplary connecting device being inserted in the cavity of two layer segments to pull the layer segments tightly together.

For example, as shown in FIG. 4, connecting device 30 may be pressed downward by a human or mechanical apparatus (e.g., an assembly robot or other automated assembly system) with sufficient force to seat connecting device 30 completely into the two layer segments 14 and 15, securely attaching segments 14 and 15 together. In some aspects, the size of enlarged end 32 may provide an interference fit between cavity 29 and connecting device 30. In these embodiments, significant downward force may be employed to insert connecting device 30. Advantageously, providing a slight taper in connecting device 30 from end 32 to end 31 may tend to pull the layer segments 14 and 15 together when connecting device is inserted into cavity 29. This pulling force may be sufficient to eliminate any gap that might otherwise exist between segments 14 and 15.

While exemplary embodiments involving connecting device 30 and cavity 29 are described above and illustrated in FIGS. 2A-4, variations of these embodiments are possible. For example, instead of providing a taper in the connecting device 30, a taper can be machined into the cavity 29 of layer segments 14 and 15, such that a bottom end and an enlarged top end are formed directly into segments 14 and 15. Thus, a taper may be present when cavity 29 is observed along a direction in which connecting device 30 is inserted into cavity 29. In these embodiments, a straight-walled connecting device 30 (i.e., a connecting device 30 without a taper between ends 31 and 32) can be used.

Additionally, while FIGS. 2A, 2B, and 4 illustrate an embodiment in which "V"-shaped ends are formed with machine 11, shapes other than a "V"-shape may be used to form the ends of layer segments 14 and 15. Other geometries are possible, including the shapes illustrated in FIGS. 5A, 5B, 6A, and 6B.

Figures 5A, 5B:
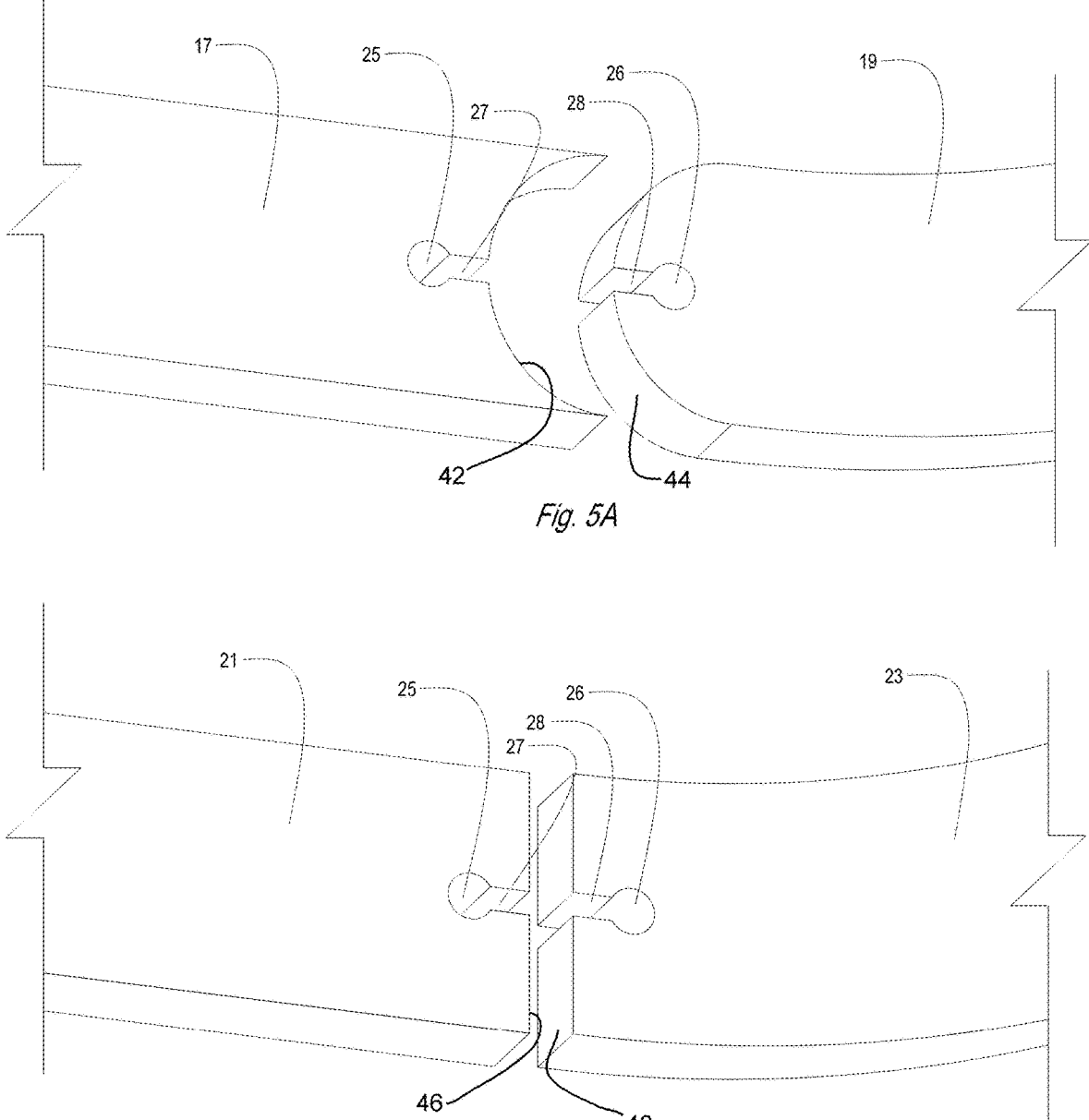
FIGS. 5A and 5B are enlarged perspective views of exemplary layer segments with rounded and straight ends, respectively.

As shown in FIG. 5A, rounded ends may be used in at least some embodiments. These ends may include a protruding end 44 and a recessed end 42. Protruding end 44 may include a central protrusion (this center being measured along a width of segment 19, for example) that faces recessed end 42. Recessed end 42 may be recessed at a central portion (as measured along a width of segment 17) with protruding lateral ends. In some aspects, slots 27 and 28 may be formed in the deepest portion of the recess and on the terminal end of the protrusion, respectively.

Some aspects of the present disclosure involve using a device 30 without forming geometrically-shaped joints at the end of two or more segments. Rather, as shown in FIG. 5B, straight ends with flat surfaces 46 and 48, or other shapes without mating recesses and protrusions, may be formed in segments 21 and 23. Flat surfaces 46 and 48 may be brought into abutting contact (e.g., forming a butt joint)

when a connecting device 30 is inserted into holes 25 and 26 and slots 27 and 28, preventing the formation of a gap between ends 46 and 48.

Figures 6A, 6B:
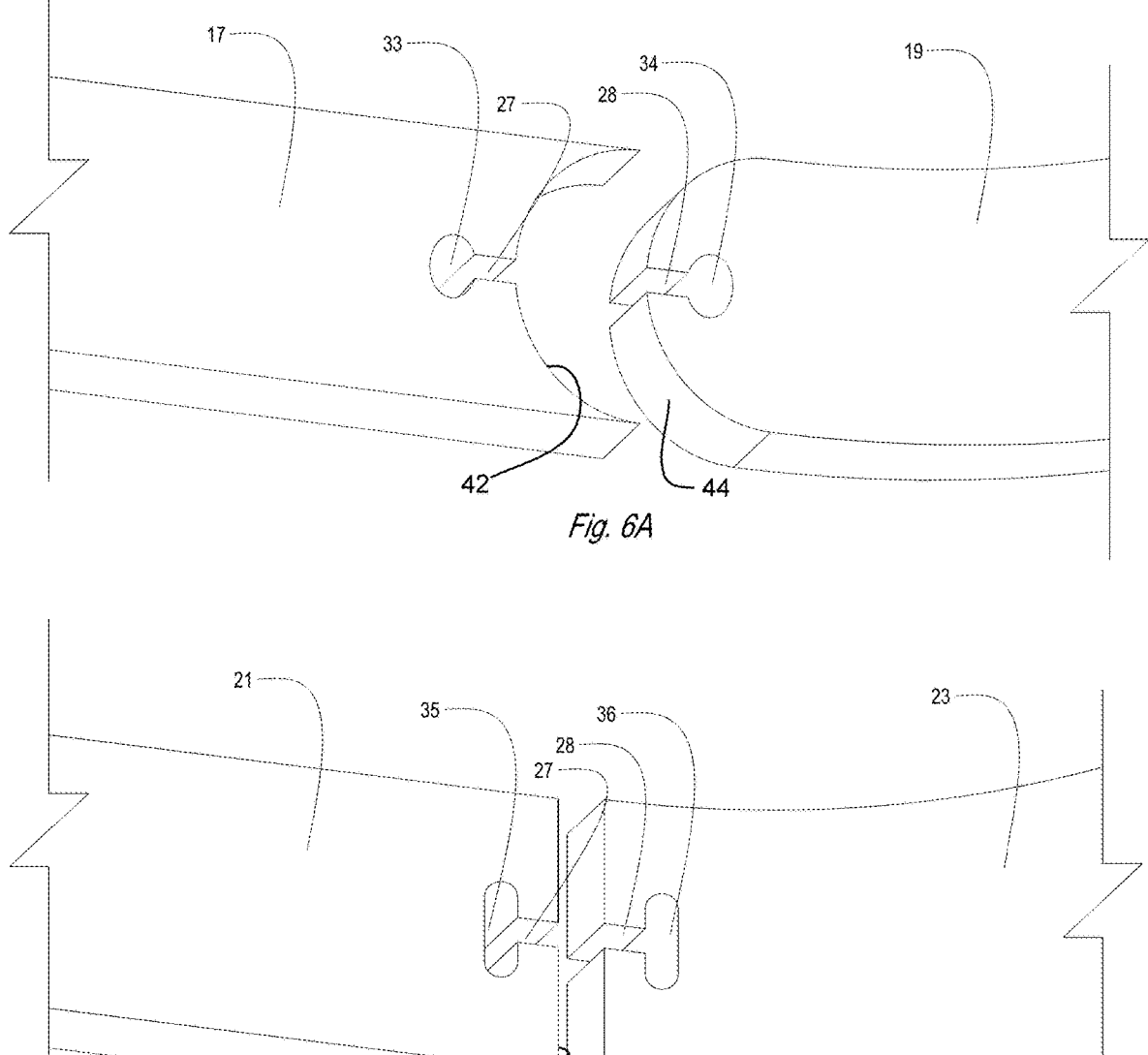
FIGS. 6A and 6B are enlarged perspective views of different exemplary cavities in different layer segments that could be used with a matching connecting device to achieve a tight end to end connection.

While some embodiments involve modifications to the protruding and recessed ends of the segments (e.g., by forming recessed and protruding ends 42 and 44), modifications may be made to cavity 29. For example, as shown in FIGS. 6A and 6B, the holes of cavity 29 may be formed in different shapes. As shown in FIG. 6A, holes 33 and 34 may be formed in the shapes of ellipses, rather than a substantially regular circle. These ellipses may be used with a connecting device 30 having similarly shaped (e.g., elliptical) rounded ends. As described above, connecting device 30 may have a tapered shape, while tapered shapes may instead be formed on holes 33 and 34 and/or slots 27 and 28.

In another example shown in FIB. 6B, holes may be formed as slots 35 and 36, in addition to slots 27 and 28. Slots 35 and 36 may be through-holes or blind holes that intersect with slots 27 and 28, respectively. Slots 35 and 36 may have rounded ends to facilitate the insertion of a connecting device 30, avoiding sharp edges or ends that could interfere with insertion of device 30. The openings formed by slots 35 and 36, like holes 33 and 34, may be used with a connection device 30 with a matching shape. A suitable device 30 may have a tapering shape, and/or slots 35 and 36 and slots 27 and 28 may have tapering shapes, to facilitate an interference fit.

Each of the above-described aspects may be included in a method of manufacturing a part from a plurality of cut segments. As an example, a method may include receiving a sheet of material 12 with a machining apparatus or cutting machine 11. The method may include removing material from the sheet of material 12, forming layer segments, such as segments 13-24 represented in FIG. 1. Two or more of segments 13-24 may be formed with complementary shapes (e.g., as shown in FIGS. 2A, 2B, and 4-6B) at respective ends of the segments by removing further material with machine 11. Slots 27 and 28 may be formed by removing additional material (e.g., with machine 11) from each segment having a complementary shape.

The method of manufacturing a part from cut segments may also include aligning the slots by placing a pair of complementary shapes in contact with each other. A cavity 29 may be formed by this contact, cavity 29 having a continuous shape defined by holes 25 and 26 and slots 27 and 28. A connecting device 30 may be inserted into cavity 29, filling cavity 29 and preventing separation of the connected segments.

In some aspects, controller 60 may be configured to generate commands to allow cutting machine 11 to perform at least a portion of the above-described method. For example, controller 60 may be programmed to generate commands that cause a machining apparatus such as machine 11 to remove material from sheet of material 12 to form the above-described segments 13-24 and connecting device 30.

From the foregoing detailed description, it will be evident that there are a number of changes, adaptations and modifications of the present method and system which come within the province of those persons having ordinary skill in the art to which the aforementioned disclosure pertains. However, it is intended that all such variations not departing from the spirit of the disclosure be considered as within the scope thereof as limited by the appended claims.

What is claimed is:

1. A system for manufacturing a part with a plurality of segments, the system comprising:

a machining apparatus configured to receive a sheet of material; and a controller configured to generate commands to control the machining apparatus, the controller being further configured to:

cause the machining apparatus to form a first segment and a second segment of the plurality of segments from the sheet of material;

cause the machining apparatus to form a first shape in an end of the first segment, the first shape including a recess;

cause the machining apparatus to form a second shape in an end of the second segment, wherein the second shape includes a protrusion, wherein the first shape of the first segment and the second shape of the second segment are complementary to one another;

cause the machining apparatus to form a first opening in the end of the first segment; and cause the machining apparatus to form a second opening in the end of the second segment, wherein a cavity is formed when the first segment is in contact with the second segment, the cavity extending from the first opening in the end of the first segment to the second opening in the end of the second segment.

2. The system of claim 1, wherein the controller is further configured to cause the machining apparatus to form the protrusion in a "V" shape.

3. The system of claim 1, wherein the controller is further configured to cause the machining apparatus to form the protrusion in a rounded shape.

4. The system of claim 1, wherein the controller is further configured to cause the machining apparatus to form the first opening through the recess, and wherein the controller being further configured to cause the machining apparatus to form the second opening through the protrusion.

5. The system of claim 1, the controller being further configured to cause the machining apparatus to remove material to form a plurality of layers that, when connected, form the part.

6. The system of claim 1, the controller being further configured to cause the machining apparatus to form a first hole at an end of the first opening and a second hole at an end of the second opening, the first hole and the second hole having circular or elliptical shapes.

7. The system of claim 1, wherein the controller being further configured to cause the machining apparatus to form a first hole at an end of the first opening and a second hole at an end of the second opening, the first hole intersecting the first opening and the second hole intersecting the second opening.

8. The system of claim 1, wherein the first segment and the second segment are segments of a single layer.

9. The system of claim 1, wherein the controller being further configured to form the first opening on an edge of the end of the first segment and form the second opening on an edge of the end of the second segment.

10. A system for manufacturing a part with a plurality of segments, the system comprising:

a machining apparatus configured to receive a sheet of material; and a controller configured to generate commands to control the machining apparatus, the controller being configured to:

cause the machining apparatus to form a first segment and a second segment of the plurality of segments from the sheet of material;

cause the machining apparatus to form a first shape in an end of the first segment, the first shape including a recess and a first pair of inclined surfaces;

cause the machining apparatus to form a second shape in an end of the second segment, wherein the second shape includes a protrusion and a second pair of inclined surfaces configured to contact the first pair of inclined surfaces, wherein the first shape of the first segment and the second shape of the second segment are complementary to one another;

cause the machining apparatus to form a first opening in the end of the first segment; and cause the machining apparatus to form a second opening in the end of the second segment, wherein, a cavity is formed when the first segment is in contact with the second segment, the cavity extending from the first opening in the end of the first segment to the second opening in the end of the second segment.

11. The system of claim 10, the controller being further configured to cause the machining apparatus to form a first hole at an end of the first opening and a second hole at an end of the second opening, the first hole intersecting the first opening and the second hole intersecting the second opening.

12. The system of claim 10, the controller being further configured to cause the machining apparatus to remove material to form a plurality of layers that, when connected, form the part.

13. The system of claim 10, wherein the first pair of inclined surfaces forms a first "V" shape, wherein the second pair of inclined surfaces forms a second "V" shape.

14. The system of claim 10, the controller being further configured to form the first opening on an edge of the end of the first segment and form the second opening on an edge of the end of the second segment.

* * * * *